United States Patent
Kalinichenko et al.

(10) Patent No.: US 10,628,599 B2
(45) Date of Patent: Apr. 21, 2020

(54) GENERATING AND DEPLOYING CUSTOMIZED SOFTWARE CONTAINERS

(71) Applicant: FMR LLC, Boston, MA (US)

(72) Inventors: Boris Kalinichenko, Jamaica Plain, MA (US); Lonergan Harrington, Providence, RI (US); Thomas Trogele, Hingham, MA (US)

(73) Assignee: FMR LLC, Boston, MA (US)

( * ) Notice: Subject to any disclaimer, the term of this patent is extended or adjusted under 35 U.S.C. 154(b) by 284 days.

(21) Appl. No.: 15/897,011

(22) Filed: Feb. 14, 2018

(65) Prior Publication Data

US 2019/0251278 A1 Aug. 15, 2019

(51) Int. Cl.
| | |
|---|---|
| *G06F 21/62* | (2013.01) |
| *H04L 29/06* | (2006.01) |
| *H04L 29/08* | (2006.01) |
| *G06F 21/44* | (2013.01) |
| *G06F 9/455* | (2018.01) |
| *H04L 9/08* | (2006.01) |

(52) U.S. Cl.
CPC ...... *G06F 21/6218* (2013.01); *G06F 9/45558* (2013.01); *G06F 21/44* (2013.01); *H04L 9/0825* (2013.01); *H04L 63/08* (2013.01); *H04L 67/1097* (2013.01); *G06F 2009/45562* (2013.01); *G06F 2009/45587* (2013.01)

(58) Field of Classification Search
CPC ..... G06F 21/6218; G06F 21/44; H04L 63/08; H04L 67/1097; H04L 9/0825
USPC ......................................................... 726/27
See application file for complete search history.

(56) References Cited

U.S. PATENT DOCUMENTS

| | | | | |
|---|---|---|---|---|
| 6,957,199 | B1 * | 10/2005 | Fisher | G06Q 20/02 705/50 |
| 7,099,846 | B1 * | 8/2006 | Ishibashi | G06Q 30/02 705/51 |
| 7,167,861 | B2 | 1/2007 | Majumder et al. | |
| 7,287,010 | B1 * | 10/2007 | Ishibashi | G06F 21/10 705/52 |
| 7,509,374 | B2 | 3/2009 | Trinh et al. | |
| 8,935,402 | B2 | 1/2015 | Henriquez et al. | |
| 9,454,671 | B2 | 9/2016 | Engberg et al. | |
| 9,471,353 | B1 | 10/2016 | Christopher et al. | |
| 9,524,183 | B1 | 12/2016 | Phelan et al. | |

(Continued)

*Primary Examiner* — Haresh N Patel
(74) *Attorney, Agent, or Firm* — Proskauer Rose LLP

(57) ABSTRACT

Methods and apparatuses are described for generating and deploying customized application software containers. Software containers on a first server comprise an application software module and an end-user-specific data set. A second server receives input data from remote computing devices and stores the input data in a master data set. The second server determines end-user-specific data sets from the master data set. The second server encrypts each of the end-user-specific data sets with an encryption key. The second server generates the software containers by executing the application software module in separate processes and storing each of the encrypted data sets in a separate container. Client computing devices authenticate to the second server to access a software container. The client devices decrypt the end-user-specific data set stored in the software container using the encryption key, and use the application software module to interact with the end-user-specific data set.

15 Claims, 4 Drawing Sheets

(56) References Cited

U.S. PATENT DOCUMENTS

| | | | |
|---|---|---|---|
| 9,729,541 B2* | 8/2017 | Qian | H04L 63/062 |
| 9,780,950 B1* | 10/2017 | Dundas | H04L 9/08 |
| 9,800,517 B1* | 10/2017 | Anderson | H04L 47/70 |
| 9,942,042 B1* | 4/2018 | Friedman | H04L 9/321 |
| 10,097,353 B1 | 10/2018 | Carlson | H04L 9/3236 |
| 2002/0107889 A1* | 8/2002 | Stone | G06F 16/10 |
| | | | 715/205 |
| 2004/0172366 A1* | 9/2004 | Muto | G06Q 30/06 |
| | | | 705/52 |
| 2005/0039034 A1* | 2/2005 | Doyle | H04L 9/0825 |
| | | | 713/193 |
| 2007/0288746 A1* | 12/2007 | Jones | H04L 63/0428 |
| | | | 713/156 |
| 2008/0177638 A1 | 7/2008 | Butler | |
| 2009/0241135 A1 | 9/2009 | Wong et al. | |
| 2009/0254912 A1 | 10/2009 | Roundtree et al. | |
| 2009/0300656 A1 | 12/2009 | Bosworth et al. | |
| 2010/0058485 A1* | 3/2010 | Gonzalez | G06F 21/10 |
| | | | 726/27 |
| 2010/0287609 A1* | 11/2010 | Gonzalez | G06F 21/10 |
| | | | 726/14 |
| 2011/0113090 A1 | 5/2011 | Peeri | |
| 2011/0125838 A1 | 5/2011 | Rao | |
| 2012/0198442 A1 | 8/2012 | Kashyap et al. | |
| 2014/0026204 A1* | 1/2014 | Buntinx | H04L 63/062 |
| | | | 726/9 |
| 2015/0154418 A1* | 6/2015 | Redberg | G06F 21/602 |
| | | | 713/165 |
| 2016/0248785 A1* | 8/2016 | Petry | H04L 63/10 |
| 2016/0342786 A1 | 11/2016 | Gerebe | |
| 2016/0359955 A1* | 12/2016 | Gill | H04L 67/1097 |
| 2017/0180346 A1 | 6/2017 | Suarez et al. | |
| 2017/0180413 A1* | 6/2017 | Petry | H04L 63/0209 |
| 2018/0034642 A1* | 2/2018 | Kaehler | H04L 9/30 |
| 2018/0097809 A1* | 4/2018 | Chakrabarti | H04L 63/10 |
| 2019/0095655 A1* | 3/2019 | Krawczewicz | H04L 9/0877 |
| 2019/0172298 A1* | 6/2019 | Just | G07C 9/00896 |

* cited by examiner

GENERATING AND DEPLOYING CUSTOMIZED SOFTWARE CONTAINERS

TECHNICAL FIELD

This application relates generally to methods and apparatuses, including computer program products, for generating and deploying customized application software containers.

BACKGROUND

Software containers have emerged as an efficient and scalable way to deliver packaged software application code for execution in an isolated environment—also known as operating system virtualization. Typically, a software container is deployed for execution as an independent process running on a server infrastructure (e.g., cloud environment). Each software container includes software elements such as code, runtime, system tools, settings, libraries and the like that enable execution of the underlying application. Examples of currently-available software container projects include Docker™, Open Container Initiative (OCI), and Amazon™ EC2 Containers.

However, current-generation software containers are not truly customizable for specific end-users—in that the containers are not able to include dynamic, user-specific data sets that are packaged as an integral and inalienable part of the container. For example, a large data set may include data elements specific to a wide array of different end-users. In order to provide containerized access to a particular end-user's data elements, the container framework must generate the end-user-specific container, then access the entire data set and extract only the end-user's data for use with the application running in the container. Such an approach leads to a host of technical challenges, such as risk of insufficient data security (i.e., one end-user could potentially access another end-user's data), inefficient data transfer and processing (i.e., latency and bandwidth issues relating to retrieval of end-user-specific data from a computing resource outside of the container), and loss of service stability and data availability (i.e., if the computing resource hosting the large data set goes offline or is unavailable, all end-users lose data access).

SUMMARY

Therefore, what is needed are methods and systems for generating and deploying customized application software containers, where each software container includes a dynamic, packaged data set that is unique to the end-user associated with the container. Upon execution of the software container, the application code within the container can quickly and securely interact with its own data set—instead of requiring retrieval of data from a source external to the container. Also, the way data is accessed might be different from one act of access to another act of access. For example, an end-user might be performing analysis of a large data set, but the data is partitioned in a particular way according to a rule described in metadata associated with a container. Even though the software, that represents instructions to be performed on the data set, is the same, the results of executing such instructions depends on the above-mentioned metadata, as data might be characterized differently based on the metadata used. An example of the metadata can be a mapping of the data attribute (if value of attribute A is Value A and value of attribute B is Value B, then value of generated human readable attribute C is Value C) or a formula performed on a collection of attributes to arrive at a human readable calculated value (value of human readable benchmark C is average of attribute A weighted by attribute B). An end-user may be motivated to analyze the same data with different metadata rules to either perform different type of analysis or to adjust previously performed analysis in case of externally required formula changes, such as adjustment of corporate or industry accepted practices in calculating a certain benchmark. To achieve the same functionality without using the customizable containers described herein requires either storing all the metadata sets, thus making it difficult for the end-user to keep track of what version of benchmark C the user is looking at or providing only one version of the benchmark C, which greatly limits the computing functionality.

The invention, in one aspect, features a system for generating and deploying customized application software containers. The system comprises one or more software containers executing on a first server computing device, each software container comprising an application software module and an end-user-specific data set. The system comprises a database device comprising a master data set that includes each of the end-user-specific data sets in the software containers. The system comprises a second server computing device coupled to the first server computing device. The second server computing device receives input data from one or more remote computing devices and storing the input data in the master data set. The second server computing device determines a plurality of end-user-specific data sets from the master data set. The second server computing device encrypts each of the plurality of end-user-specific data sets with an encryption key associated with a different end-user. The second server computing device generates the one or more software containers by executing the application software module in a plurality of separate processes and storing one of the plurality of encrypted end-user-specific data sets in a separate container. The system includes one or more client computing devices, each associated with a different end-user. Each client computing device authenticates to the second server computing device to receive access to a software container associated with the end-user, accesses the software container on the first computing device, decrypts the end-user-specific data set stored in the software container using the encryption key, and uses the application software module executing in the software container to interact with at least a portion of the end-user-specific data set in a user interface on the client computing device.

The invention, in another aspect, features a computerized method of generating and deploying customized application software containers. A first server computing device executes one or more software containers, each software container comprising an application software module and an end-user-specific data set. A second server computing device coupled to the first server computing device receives input data from one or more remote computing devices and storing the input data in a master data set on a database device. The second server computing device determines a plurality of end-user-specific data sets from the master data set and encrypts each of the plurality of end-user-specific data sets with an encryption key associated with a different end-user. The second server computing device generates the one or more software containers by executing the application software module in a plurality of separate processes on the first computing device and storing one of the plurality of encrypted end-user-specific data sets in a separate container.

A plurality of client computing devices, each associated with a different end-user, authenticates to the second server computing device to receive access to a software container associated with the end-user. Each client computing device accesses the software container on the first computing device. Each client computing device decrypts the end-user-specific data set stored in the software container using the encryption key, and uses the application software module executing in the software container to interact with at least a portion of the end-user-specific data set in a user interface on the client computing device.

The invention, in another aspect, features a computer program product, tangibly embodied in a non-transitory computer readable storage device, for generating and deploying customized application software containers. The computer program product includes instructions that, when executed, cause a first server computing device to execute one or more software containers, each software container comprising an application software module and an end-user-specific data set. The computer program product includes instructions that, when executed, cause a second server computing device coupled to the first server computing device to: receive input data from one or more remote computing devices and storing the input data in a master data set on a database device; determine a plurality of end-user-specific data sets from the master data set; encrypt each of the plurality of end-user-specific data sets with an encryption key associated with a different end-user; and generate the one or more software containers by executing the application software module in a plurality of separate processes on the first computing device and storing one of the plurality of encrypted end-user-specific data sets in a separate container. The computer program product includes instructions that, when executed, cause a plurality of client computing devices each associated with a different end-user to: authenticate to the second server computing device to receive access to a software container associated with the end-user; access the software container on the first computing device; decrypt the end-user-specific data set stored in the software container using the encryption key; and use the application software module executing in the software container to interact with at least a portion of the end-user-specific data set in a user interface on the client computing device.

Any of the above aspects can include one or more of the following features. In some embodiments, the encryption key comprises a public key. In some embodiments, each client computing device exchanges a private key with the first computing device upon accessing the software container in order to decrypt the end-user-specific data set. In some embodiments, a copy of the public key is stored on the client computing device.

In some embodiments, the application software module in the software container accesses the end-user-specific data set in the software container upon receiving instructions from the client computing device that is accessing the software container. In some embodiments, the second server computing device determines the plurality of end-user-specific data sets from the master data set by identifying one or more end-user identifiers in the master data set and extracting data from the master data set that is associated with each end-user identifier. In some embodiments, the first server computing device comprises a cloud-based architecture.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
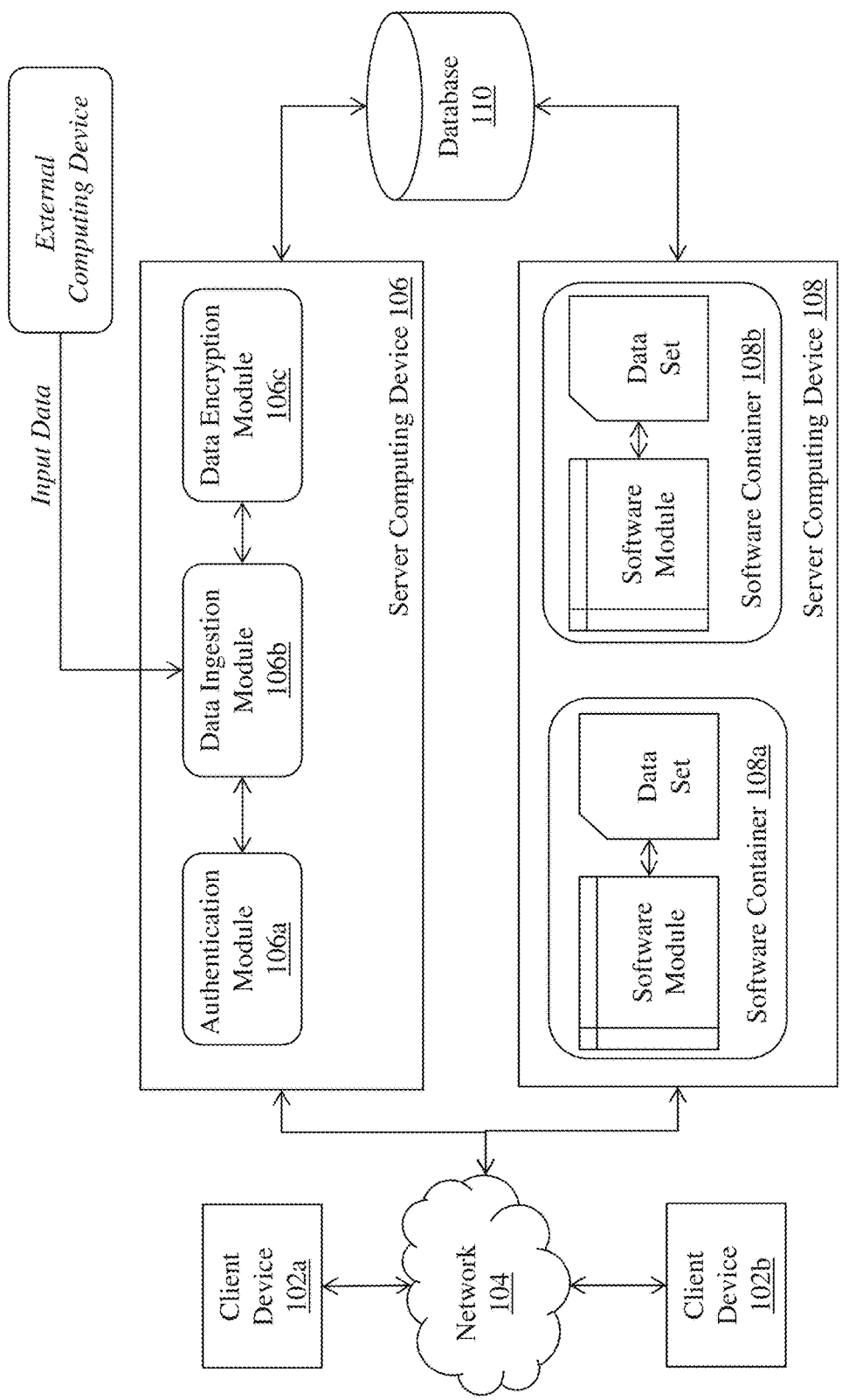
FIG. 1 is a block diagram of a system for generating and deploying customized application software containers.

FIG. 1 is a block diagram of a system 100 for generating and deploying customized application software containers. The system 100 includes a plurality of client devices 102a-102b that are each coupled via communications network 104 to server computing device 106 and server computing device 108. The server computing device 106 includes an authentication module 106a, a data ingestion module 106b that is coupled to one or more external computing devices, and a data encryption module 106c. The server computing device 108 includes a plurality of software containers 108a-108b that each include a software module and a data set. Each of the server computing device 106 and server computing device 108 is coupled to database 110.

The client computing devices 102a-102b connect to the communications network 104 in order to communicate with the server computing device 106 and the server computing device 108 to provide input and receive output relating to the process of generating and deploying customized application software containers as described herein. The client computing devices 102a-102b can be coupled to a display device (not shown). For example, client computing devices 102a-102b can provide a detailed graphical user interface (GUI) via the display device that presents output resulting from the methods and systems described herein, where the GUI is utilized by an operator to review end-user-specific data sets packaged in a software container accessed by the client computing device 102a-102b.

Exemplary client devices 102a-102b include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client devices 102a-102b, it should be appreciated that the system 100 can include any number of client devices.

The communication network 104 enables the other components of the system 100 to communicate with each other in order to perform the process of generating and deploying customized application software containers as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 106a-106c—that are executed by a processor of the server computing device 106, to receive data from other components of the system 100, transmit data to other components of the system 100, and perform functions for generating and deploying customized application software containers as described herein. In some embodiments, the modules 106a-106c are specialized sets of computer software instructions programmed onto a dedicated processor in the server computing device 106 and can include specifically-designated memory locations and/or registers for executing the specialized computer software instructions. Further explanation of the specific processing performed by the modules 106a-106c will be provided below.

Similarly, the server computing device 108 is a combination of hardware, including one or more special-purpose processors and one or more physical memory modules, and specialized software—such as software containers 108a-108b—that are executed by a processor of the server computing device 108, to receive data from other components of the system 100, transmit data to other components of the system 100, and perform functions for generating and deploying customized application software containers as described herein. In some embodiments, the software containers 108a-108b comprise a software module (i.e., software code files, environment variables, libraries, other dependencies, and the like) and a data set (i.e., data files and/or a local database). The server computing device 108 (also called the control host) can be configured to execute many software containers, in isolation from each other, that access a single operating system (OS) kernel. The server computing device 108 executes each software container in a separate OS process, and constrains each container's access to physical resources (e.g., CPU, memory) of the server computing device so that a single container does not utilize all of the available physical resources. Upon execution, the server computing device 108 executes the software application code stored in the container, which in turn accesses the data set stored in the container, for presentation of the data set (e.g., via UI elements) on a client computing device.

The database 110 comprises transient and/or persistent memory for data storage, that is used in conjunction with the generating and deploying customized application software containers described herein. Generally, the database 110 is configured to receive, generate, and store specific segments of data relating to the process of generating and deploying customized application software containers as described herein. In some embodiments, all or a portion of the database 110 can be integrated within the server computing device 106, within the server computing device 108, or be located on a separate computing device or devices. For example, the database 110 can comprise a database such as MySQL™ available from Oracle Corp. of Redwood City, Calif. Also, as shown in FIG. 1, certain modules in the server computing device can be coupled (via network) to one or more external applications, services, providers, and/or ecosystems—as will be described in detail below.

In some embodiments, the software containers can be deployed on commodity hardware in a custom or commercially-available cloud container environment, such as Amazon® AWS™, Microsoft® Azure™, Rackspace™ Managed Hosting, and the like. Also, various container orchestration mechanisms can be used such as Kubernetes™, Apache Mesos™, Boxfuse™, etc. One or two-way SSL encryption can be used to access data.

Figure 2:
FIG. 2 is a flow diagram of a computerized method of generating and deploying customized application software containers.

FIG. 2 is a flow diagram of a computerized method 200 of generating and deploying customized application software containers, using the system 100 of FIG. 1. The data ingestion module 106b of server computing device 106 receives (202) input data from one or more external computing devices that are remote from the server 106. For example, the input data could be a large, master data set (e.g., complex, real-time transactional data) comprising thousands or millions of data elements that relate to a plurality of different end-users of the system 100. The data ingestion module 106b connects to the remote computing devices via a network and receives the master data set for storage, e.g., in database 110. In some embodiments, the data ingestion module 106b is continuously receiving additional data elements from the remote computing devices (e.g., streaming data) and updates the master data set in the database 110 accordingly.

The data ingestion module 106b determines (204) a plurality of end-user-specific data sets from the master data set. As the data set is received by the data ingestion module 106b, the module 106b can analyze the data elements to determine which data elements pertain to particular end-users and store the end-user-specific data elements in a separate database, table, or similar data structure. In one example, each data element can have an end-user identifier (e.g., ID number, account number, or the like) appended to the data element and the data ingestion module 106b can allocate specific data elements for that end-user identifier to a defined location in the database 110. In this way, the data ingestion module 106b creates separate end-user-specific data sets for integration with the software containers as described below.

Either as part of storing the end-user-specific data sets in the database 110 or after the end-user-specific data sets are stored in the database 110, the data encryption module 106c of server computing device 106 encrypts (206) each of the end-user-specific data sets with an encryption key associated with a different end-user (i.e., the end-user to which the data in the data set pertains). In one example, the data encryption module 106c uses a public key infrastructure (PKI) to encrypt and decrypt the end-user-specific data sets. The data encryption module 106c generates a public key-private key pair for the end-user, binds the public key with an identity of the end-user, and then encrypts the end-user-specific data set with that public key (which is also stored on or known to the client computing device (e.g., 102a) of the related end-user). The private key can be transmitted to and stored on the client computing device 102a for use in decrypting the data set as described below. It should be appreciated that other types of data encryption methodologies can be used within the scope of invention described herein.

The server computing device 108 then generates (208) one or more software containers (e.g., containers 108a-108b) by executing an application software module in a plurality of separate processes. As described above, the server computing device 108 generates isolated software containers for each of the different end-users and makes the software containers available for communication with the respective client computing devices 102a-102b by executing the software code in the container package. As part of this process, the server computing device 108 also retrieves the encrypted end-user-specific data set (e.g., from database 110) and packages the data set into the software container for that end-user. As such, the end-user-specific data set is now stored locally within the framework of the software container—instead of being located in an external database.

In some embodiments, the server computing device 108 generates each software container upon receiving an indication from the server computing device 106 that an end-user is attempting to log in and access its software container. For example, an end-user at client computing device 102a can transmit a software container access request to authentication module 106a of server computing device 106—indicating that the client computing device 102a wants to utilize its related software container. The authentication module 106a authenticates (210) the client computing device 102a (e.g., by requesting authentication credentials from the client device 102a and verifying the credentials) so that the client computing device 102a can access its software container 108a. Upon authentication, the server computing device 106 issues a notification to the server computing device 108 that the end-user is authenticated and the server computing device 108 generates the software container for that end-user. In some embodiments, the server computing device 106 then transfers the communication session to the server computing device 108, so that the client device 102a and the server 108 have a direct communication session— instead of being routed through the server computing device 106.

Figure 3:
FIG. 3 is an exemplary screenshot of tabular UI elements generated by a customized application software container.
Figure 4:
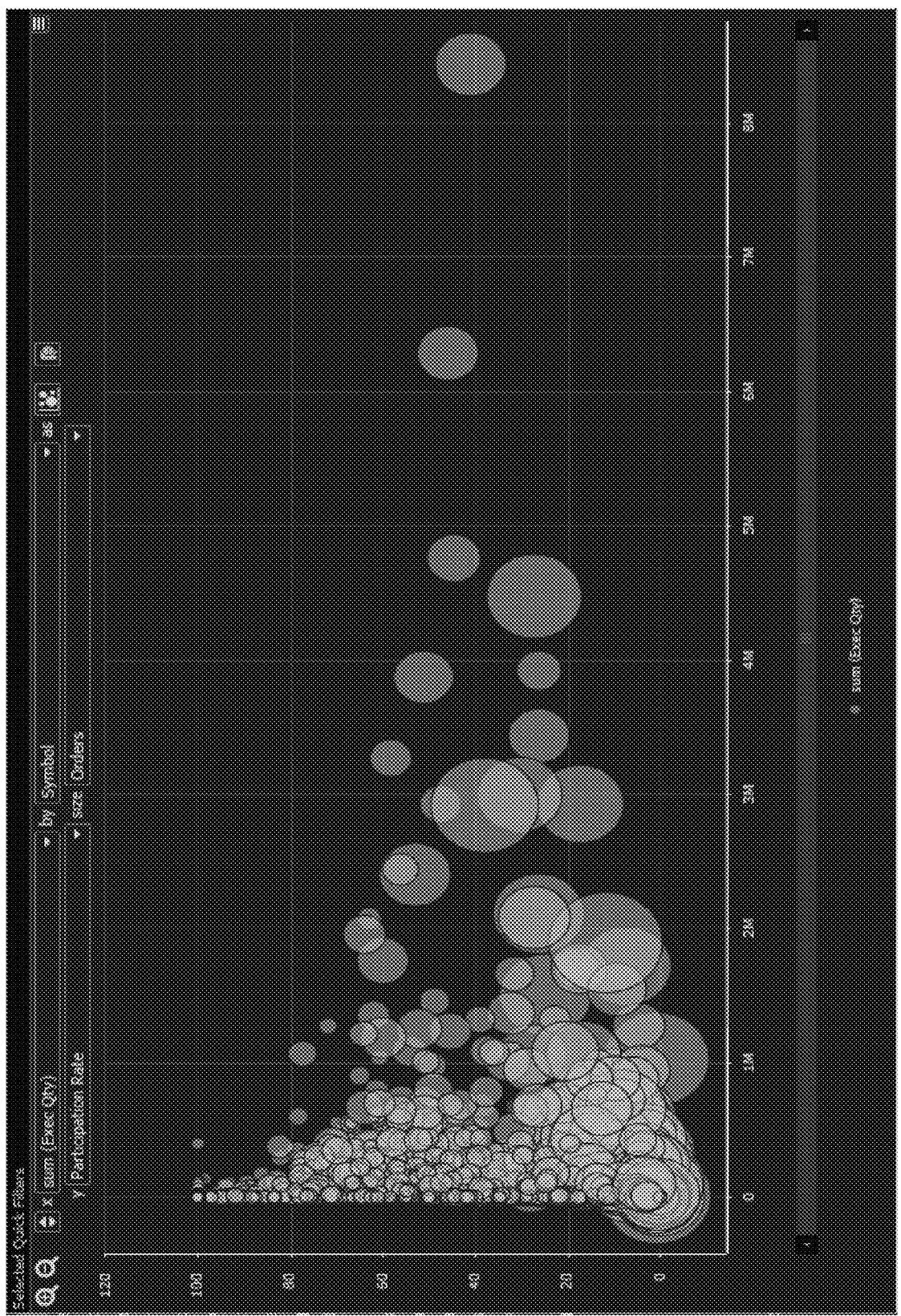
FIG. 4 is an exemplary screenshot of graphical UI elements generated by a customized application software container.

The client computing device 102a accesses (212) the software container 108a and receives UI elements generated by the container framework for display on the client device 102a. The client computing device 102a also transmits the private key generated previously to the software container 108a, and the software container 108a decrypts (214) the end-user-specific data set stored in the software container 108a using the private key—so that the software code executing in the container can access the data set and generate UI elements including the data elements for the client computing device 102a. The client computing device 102a uses (216) the application software module executing in the container to interact with at least a portion of the data set (e.g., via graphs, charts, tables, and the like). FIG. 3 is an exemplary screenshot of tabular UI elements generated by a customized application software container, and FIG. 4 is an exemplary screenshot of graphical UI elements generated by a customized application software container.

One use case of the technological improvements to the software containers as described herein relates to the massive data sets involved in asset management and securities trading. When a large order is executed, such an order is rarely sent to the marketplace directly—as releasing information about the intent to buy or sell a large block of shares spikes up interest from the market manipulators and puts investors who entrusted their savings to asset managers at a disadvantage.

To improve trade execution (i.e., to pay less when buying shares or get more when selling shares) software/hardware complexes, known as algorithmic trading—or "algos"—are used. An algo looks at the order, splits the order into a multitude of much smaller orders, and executes those orders in different venues such as dark pools, stock exchanges or through other available venues. Different venues provide different liquidity, for example. It is advantageous for an asset manager to execute his or her order in a venue that has liquidity for a particular stock as, generally speaking, higher liquidity in a venue directly results in a higher probability that the price will not be affected by asset manager buying or selling stock.

Different algos are configured in different way based on asset manager requirements and general "spirit" of the algo. Some algos are designed to guarantee higher likelihood of expected purchase/sell price not changing while others are designed to guarantee higher likelihood of an order to be fully executed in a limited period of time without paying too much attention to the price fluctuation during the period when shares are bought or sold.

Asset managers have responsibility to investors who entrusted their money with asset managers so asset managers are interested in making sure that the trading is performed in the most efficient way based on asset manager's requirements.

To make intelligent decisions on what algos/venue to use, a process called transaction cost analysis (TCA) is performed. TCA is a process of calculating various benchmarks (i.e., numeric values) where input parameters to the formulas are orders, executions and market data. Benchmarks can be assigned to an individual execution, individual order, group of orders, group of executions etc. As a result of performing TCA a user has access to data presented in a multitude of forms such as grids, bar charts, pie charts, stock charts with indicators plotted on such charts, PDF reports, email notifications, and so forth.

During TCA, trades (other a large block or individual components from the block) are analyzed and compared to theoretical trades that would have executed slightly differently. For example, an asset manager would be interested how his/her cost of executing a trade would have changed if he participated in the trading more aggressively (i.e., sold/bought more during the same period of time) or less aggressively. Knowing performance obtained from different venues helps asset managers to save money on trading by honing their trading strategy and in the end paying less for the stock that asset manager is trying to purchase.

In order to perform analysis, all the relevant data needs to be available during analysis. Relevant data includes, but is not limited to:

Orders (buy 100 shares of IBM in Dark Pool A);
Executions (50 shares of IBM were purchased in Dark Pool A at a price X);
Market data (IBM traded at price X1 at time T1, X2 at time T2, etc.);

Because orders placed by asset managers are very large, penalties that the asset manager might pay in the form of a suboptimal cost of shares purchased/sold are significant and directly affect, for example, reported mutual fund performance, if the asset manager manages a mutual fund.

Divulging information about trades performed on behalf of asset manager creates a significant problem to an asset manager as a third party can take advantage of such information. For example, if asset manager A wants to buy a large block of common stock S, a speculator, in anticipation that asset manage A will be buying stock can buy stock S and then try selling it to the asset manager A at a higher price, thus putting asset manager A at a disadvantage.

Therefore, the techniques described herein of isolated software containers executing on encrypted end-user-specific data sets can be leveraged in the TCA context to deliver an improved computing system that ensures data privacy and efficient, dynamic access to data sets. For example, the software code in each software container may relate to creating TCA models (i.e., formulas) to perform data analysis. While the code in each container is the same for different end-users, as mentioned above the data set is particular to the end-user and is not shared with or accessible to other end-users (as it might be in the prior art systems that utilize a common database). The technological approach herein is particularly well-suited for a cloud-based computing deployment, where a service provider that provides the server computing device 106 is not in control of the hardware (i.e., server computing device 108) that runs the TCA software containers—so in the event of a physical loss of hardware, the loss is limited as the data set that is lost with the hardware can only be decrypted by a specific end-user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for generating and deploying customized application software containers, the system comprising:
   one or more software containers executing on a first server computing device, each software container comprising an application software module and an end-user-specific data set;
   a database device comprising a master data set that includes each of the end-user-specific data sets in the software containers;
   a second server computing device coupled to the first server computing device, the second server computing device:
      receiving input data from one or more remote computing devices and storing the input data in the master data set;
      determining a plurality of end-user-specific data sets from the master data set;
      encrypting each of the plurality of end-user-specific data sets with an encryption key associated with a different end-user; and
      generating the one or more software containers by executing the application software module in a plurality of separate processes and storing one of the plurality of encrypted end-user-specific data sets in a separate container; and
   one or more client computing devices, each associated with a different end-user, wherein each client computing device:
      authenticates to the second server computing device to receive access to a software container associated with the end-user;
      accesses the software container on the first computing device;
      decrypts the end-user-specific data set stored in the software container using the encryption key; and
      uses the application software module executing in the software container to interact with at least a portion of the end-user-specific data set in a user interface on the client computing device.

2. The system of claim 1, wherein the encryption key comprises a public key.

3. The system of claim 2, wherein each client computing device exchanges a private key with the first computing device upon accessing the software container in order to decrypt the end-user-specific data set.

4. The system of claim 2, wherein a copy of the public key is stored on the client computing device.

5. The system of claim 1, wherein the application software module in the software container accesses the end-user-specific data set in the software container upon receiving instructions from the client computing device that is accessing the software container.

6. The system of claim 1, wherein the second server computing device determines the plurality of end-user-specific data sets from the master data set by identifying one or more end-user identifiers in the master data set and extracting data from the master data set that is associated with each end-user identifier.

7. The system of claim 1, wherein the first server computing device comprises a cloud-based architecture.

8. A computerized method of generating and deploying customized application software containers, the method comprising:
   executing, on a first server computing device, one or more software containers, each software container comprising an application software module and an end-user-specific data set;
   receiving, by a second server computing device coupled to the first server computing device, input data from one or more remote computing devices and storing the input data in a master data set on a database device;
   determining, by the second server computing device, a plurality of end-user-specific data sets from the master data set;
   encrypting, by the second server computing device, each of the plurality of end-user-specific data sets with an encryption key associated with a different end-user;
   generating, by the second server computing device, the one or more software containers by executing the application software module in a plurality of separate processes on the first computing device and storing one of the plurality of encrypted end-user-specific data sets in a separate container;
   authenticating, by a plurality of client computing devices each associated with a different end-user, to the second server computing device to receive access to a software container associated with the end-user;
   accessing, by each client computing device, the software container on the first computing device;
   decrypting, by each client computing device, the end-user-specific data set stored in the software container using the encryption key; and
   using, by each client computing device, the application software module executing in the software container to interact with at least a portion of the end-user-specific data set in a user interface on the client computing device.

9. The method of claim 8, wherein the encryption key comprises a public key.

10. The method of claim 9, wherein each client computing device exchanges a private key with the first computing device upon accessing the software container in order to decrypt the end-user-specific data set.

11. The method of claim 9, wherein a copy of the public key is stored on the client computing device.

12. The method of claim 8, wherein the application software module in the software container accesses the end-user-specific data set in the software container upon receiving instructions from the client computing device that is accessing the software container.

13. The method of claim 8, wherein the second server computing device determines the plurality of end-user-specific data sets from the master data set by identifying one or more end-user identifiers in the master data set and extracting data from the master data set that is associated with each end-user identifier.

14. The system of claim 8, wherein the first server computing device comprises a cloud-based architecture.

15. A computer program product, tangibly embodied in a non-transitory computer readable storage device, for generating and deploying customized application software containers, the computer program product including instructions that, when executed:

execute, on a first server computing device, one or more software containers, each software container comprising an application software module and an end-user-specific data set;

receive, by a second server computing device coupled to the first server computing device, input data from one or more remote computing devices and storing the input data in a master data set on a database device;

determine, by the second server computing device, a plurality of end-user-specific data sets from the master data set;

encrypt, by the second server computing device, each of the plurality of end-user-specific data sets with an encryption key associated with a different end-user;

generate, by the second server computing device, the one or more software containers by executing the application software module in a plurality of separate processes on the first computing device and storing one of the plurality of encrypted end-user-specific data sets in a separate container;

authenticate, by a plurality of client computing devices each associated with a different end-user, to the second server computing device to receive access to a software container associated with the end-user;

access, by each client computing device, the software container on the first computing device;

decrypt, by each client computing device, the end-user-specific data set stored in the software container using the encryption key; and use, by each client computing device, the application software module executing in the software container to interact with at least a portion of the end-user-specific data set in a user interface on the client computing device.

\* \* \* \* \*